Jan. 16, 1962　　　A. F. BRUNKOW ETAL　　　3,016,931
SEMI-AUTOMATIC MULTIBLADE POWER SAW
Filed Oct. 30, 1959　　　　　　　　　　　　　　4 Sheets-Sheet 1

Alvin F. Brunkow
James Brunkow
INVENTORS

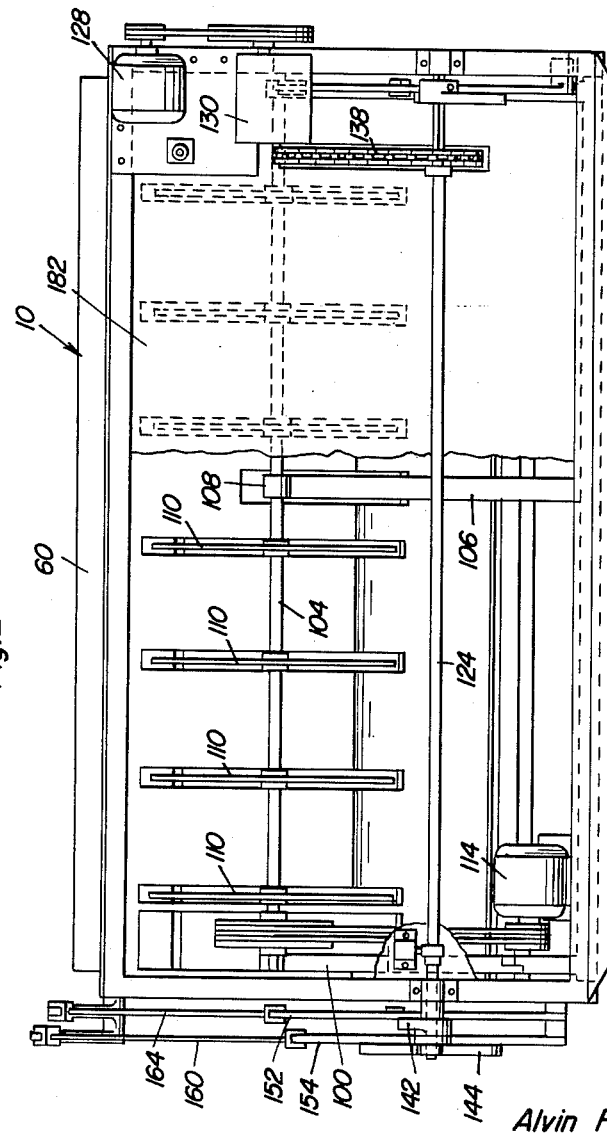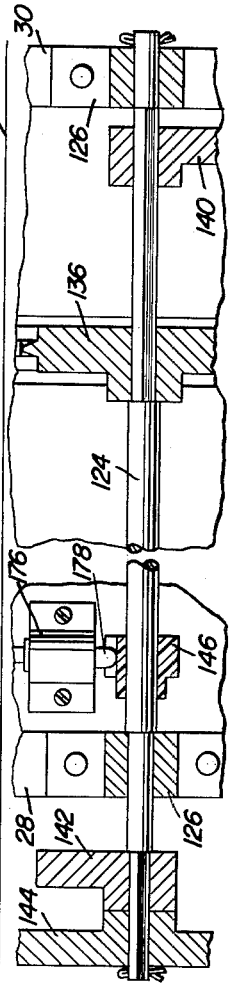

Jan. 16, 1962 A. F. BRUNKOW ETAL 3,016,931
SEMI-AUTOMATIC MULTIBLADE POWER SAW
Filed Oct. 30, 1959 4 Sheets-Sheet 3
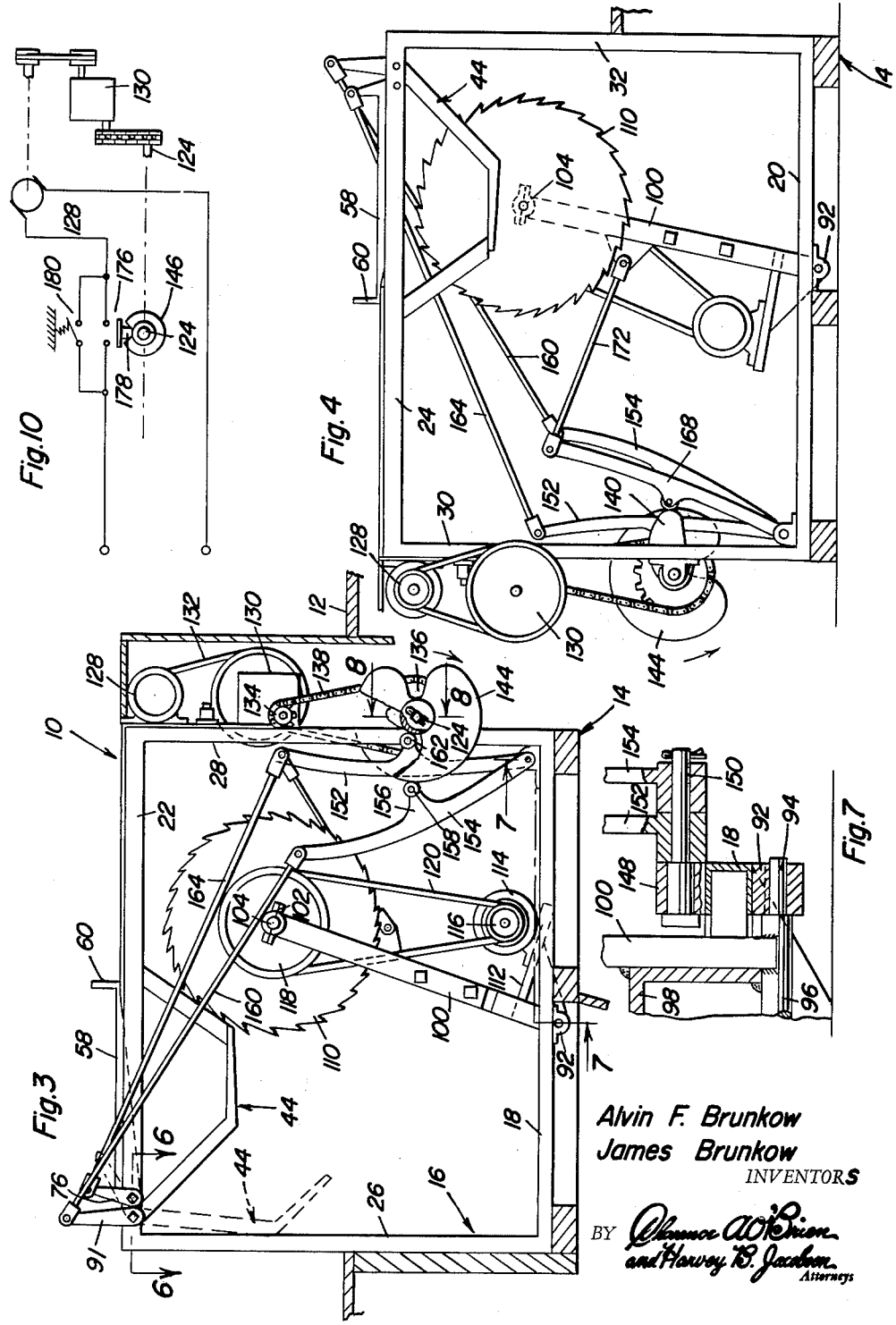
Alvin F. Brunkow
James Brunkow
INVENTORS

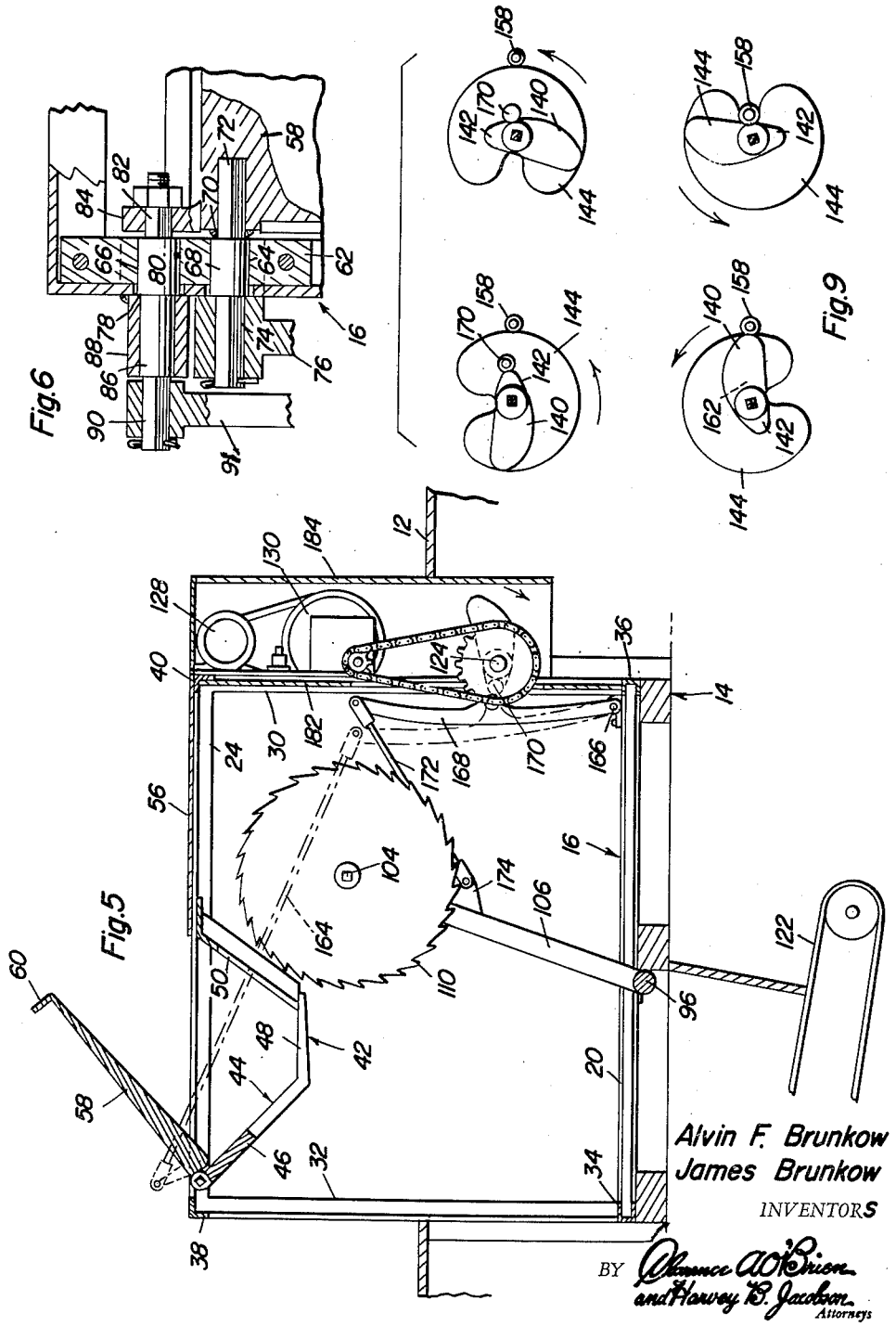

United States Patent Office 3,016,931
Patented Jan. 16, 1962

3,016,931
SEMI-AUTOMATIC MULTIBLADE POWER SAW
Alvin F. Brunkow, R.F.D. 1, Nelson, Wis., and
James Brunkow, Box 61, Pepin, Wis.
Filed Oct. 30, 1959, Ser. No. 849,838
5 Claims. (Cl. 143—46)

This invention relates in general to new and useful improvements in power saws, and more specifically to a novel multiblade power saw for cutting up slabbing and the like.

In the lumber industry, in the formation of lumber, slabs are initially cut from the trees so as to remove the bark in the initial step of sawing a tree into lumber. Depending upon the particular nature of the tree and the locale, the slab is used for a variety of uses. One of these uses relates to fire wood wherein the slab is cut into relatively short lengths suitable for burning.

At the present time the cutting of slabs into short lengths for burning is relatively expensive since a man must continuously feed the slabs to a saw cutting off one length of fire wood at a time. As a result, it is hardly economical to cut the slab and sell it for fire wood.

In view of the foregoing, it is the primary object of this invention to provide a multiblade power saw which is particularly adapted to cutting slabs into relatively short lengths for fire wood.

Another object of the invention is to provide a multiblade power saw which includes a hopper for holding a plurality of slabs to be cut into short lengths, and a multiblade power saw unit which is swingable through the hopper so as to cut the individual slabs disposed therein into a plurality of short lengths, after which the hopper may be opened and the short pieces of fire wood discharged therefrom.

Still another object of the invention is to provide a power saw for cutting slabs into short lengths for fire wood, the power saw being semi-automatic in operation and requiring only the charging of a hopper with slabs, after which when the operation thereof is initiated, a gang saw will pass through the hopper sawing the slabs disposed therein into short lengths, following which the bottom of the hopper will open to discharge the cut pieces of fire wood.

A further object of the invention is to provide a multibladed saw which is semi-automatic in operation and which is particularly adapted for cutting slabs into short lengths for use as fire wood, the saw including a hopper which is provided with a loading door and which has a pivotally mounted bottom member to facilitate the discharge of cut slabs therefrom, there being associated with the hopper a gang saw or a multi-bladed saw which will swing through the hopper to cut the slabs therein into short lengths, after which the bottom of the hopper may be opened to permit the discharge of the cut pieces of slabs in a simple operation.

A still further object of the invention is to provide a novel saw for cutting slabs into short lengths for fire wood, the saw being semi-automatic in operation in that it requires only the charging of a hopper of the saw with the slabs and the initiation of the operation of the saw by pressing a control switch, the saw having a control circuit which will automatically control the swinging of the saw unit of the saw, as well as automatically moving a loading door of the hopper between a loading position and the closed position, and the swinging of a bottom member of the hopper between a hopper forming position and a discharge position, all of these being operated in timed sequence once the hopper has been charged and the operation of the saw initiated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view with parts broken away and shows the specific details of the saw, including the specific details of the control for automatically operating the components of the saw;

FIGURE 3 is an end view of the saw and shows the general relationship of the saw unit and the hopper, as well as the control for operating the same;

FIGURE 4 is an end view of the saw taken from the opposite end of the saw from that illustrated in FIGURE 3 and shows further the details of the controls for operating the components of the saw, the saw unit being illustrated in a sawing position;

FIGURE 5 is a transverse vertical sectional view taken substantially upon the plane indicated by the section line 5—5 of FIGURE 1 and shows other details of the saw, the loading door for the hopper being shown in an open position, and there being illustrated the details of a conveyor for taking away the sawed pieces of slabs;

FIGURE 6 is an enlarged fragmentary sectional view taken substantially upon the plane indicated by the section line 6—6 of FIGURE 3 and shows the specific details of the mounting of the hopper loading door and the hopper bottom member;

FIGURE 7 (sheet 3) is an enlarged fragmentary sectional view taken substantially upon the plane indicated by the section line 7—7 of FIGURE 3 and shows the specific details of the mounting of the saw unit and levers for operating the loading door and the bottom member of the hopper;

FIGURE 8 (sheet 2) is an enlarged fragmentary sectional view taken substantially upon a plane indicated by the section line 8—8 of FIGURE 3 and shows the specific arrangement of the cams on the control shaft, an intermediate portion of the control shaft being omitted;

FIGURE 9 (sheet 4) is a schematic representation of the arrangement of the various cams and their followers in the various positions of the saw during the operation thereof; and FIGURE 10 (sheet 3) is a schematic wiring diagram showing the controls for operating the saw.

Figure 1:
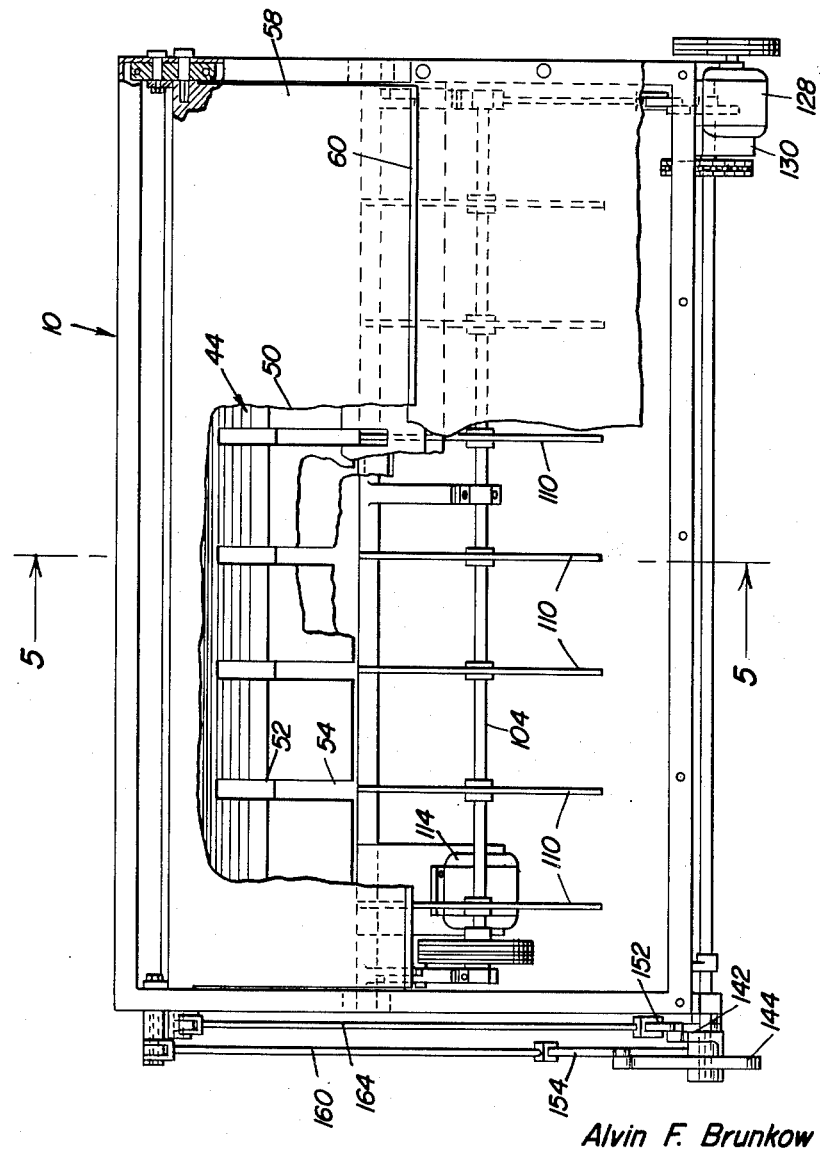
FIGURE 1 is a plan view with parts broken away and shows the general arrangement of the components of the power saw.

Referring now to the drawings in detail, it will be seen that the power saw, which is the subject of this invention, is mounted partially in a pit in a mill floor. The power saw is generally referred to by the numeral 10 and the mill floor is referred to by the numeral 12. The relationship of the power saw with respect to the mill floor 12 is best illustrated in FIGURES 3 and 5. A suitable support structure, generally referred to by the numeral 14 is built into the mill floor and supports the saw 10. Since the details of the support structure 14 may be varied according to the construction of the mill and the particular installation of the saw 10, no further description of the support structure 14 is believed to be necessary.

The saw 10 includes a generally box-like frame which is referred to in general by the reference numeral 16. The frame 16 includes a pair of bottom end members 18 and 20 and a pair of top end members 22 and 24. The end members 18 and 22 are connected together by uprights 26 and 28. The end members 20 and 24 are connected together by uprights 30 and 32. A bottom longitudinal frame member 34 extends between the lower ends of the uprights 26 and 32. A similar longitudinal frame member 36 extends between the lower ends of the uprights 28 and 30. Upper longitudinal members 38 and 40 overlie the longitudinal members 34 and 36, respectively.

Disposed in the upper forward corner of the frame 16 is a hopper, generally referred to by the numeral 42. The hopper 42 includes an angular bottom member generally referred to by the numeral 44 and including a downwardly and inwardly sloping portion 46 and a horizontal bottom portion 48. The bottom member 44 cooperates with a side member 50 to define the hopper 42. The side member 50 is fixed in depending relation from the upper part of the frame 16. At this time it is pointed out that both the bottom member 44 and the side member 50 are provided with aligned slots for the reception of saw blades. The slots are referred to by the numerals 52 and 54, respectively, and are best illustrated in FIGURE 1.

The hopper 42 has associated therewith a loading table 56 which is in the form of a plate overlying the top of the frame 16 adjacent the hopper 42. Slabs to be cut may be piled on the loading table 56 and are pushed into the hopper 42 when it is desired to load the same.

In order to protect the operator of the saw 10, the hopper 42 is provided with a loading door 58 which is closed during the operation of a saw unit to be described in detail hereinafter. It is to be noted that the pivot for the loading door 58 is disposed adjacent the pivot for the bottom member 44. It is also pointed out that the loading door 58 is provided with an upstanding guard 60 disposed adjacent the loading table 56 to prevent the slabs being loaded on the loading table 56 from being placed on the loading door 58.

Reference is now made to FIGURE 6 in detail wherein the specific details of the mounting of the bottom member 44 and the loading door 58 are illustrated. At each side of the frame 16 there is incorporated a bearing block 62. Each bearing block 62 has a lower bearing portion 64 and an upper bearing portion 66. A journal 68 of a shaft 70 is rotatably mounted in the bearing portion 64 and extends through the arcuate face of the bearing block 62. The shaft 70 includes one non-circular end portion 72 which is interlocked with the loading door 58 for movement therewith. The opposite end portion of the shaft 70 is referred to by the numeral 74 and is also of a non-circular cross-section. The end portion 74 is rigidly secured to one end of a lever 76, the purpose of which will be described in detail hereinafter.

A second shaft 78 has a journal portion 80 which is rotatably journaled in the bearing portion 66 of the bearing block 62. The shaft 78 has a non-circular cross-sectional end portion 82 which is secured to a projecting ear 84 of the bottom member 44. The opposite part of the shaft 78 includes an intermediate portion 86 which is disposed within a sleeve 88 extending out from the frame 16. The opposite end of the shaft 78 terminates in a non-circular cross-section end portion 90 on which a lever 91 is secured.

A pair of transversely aligned pillow blocks 92 (FIGURE 7) are secured to the undersides of the frame members 18 and 20. The pillow blocks 92 receive reduced end portions 94 of a transverse shaft 96. The transverse shaft 96 is reinforced by an angle member 98. Secured to the shaft 96 adjacent the opposite ends thereof are upstanding arms 100 which are provided at the upper ends thereof with pillow blocks 102 in which a saw shaft 104 is rotatably journaled. There is also provided an intermediate upstanding member 106 which is provided with a pillow block 108 at the upper end thereof for supporting an intermediate portion of the shaft 104. A plurality of circular saw blades 110 are secured to the shaft 104 in equidistant spaced relation and are rotatable with the shaft 104.

The angle member 98 extends to one side of the shaft 96 and a portion thereof serves as a supporting platform 112 for an electric motor 114. The electric motor 114 is provided with a drive pulley 116 which is aligned with a pulley 118 on the shaft 104 at one end thereof. A drive belt 120 is entrained over the pulleys 116 and 118. At this time it is pointed out that the pulleys 116 and 118 may be of the multiple belt type and a number of drive belts 120 may be provided to connect the two.

Reference is now made to FIGURE 5 in particular wherein is shown that an endless conveyor 122 is disposed in underlying relation with respect to the frame 16 and the support 14. The conveyor belt 122 underlies the hopper 42 and is intended to receive cut pieces of slabs therefrom. The conveyor belt 122 may convey the cut pieces of slab to the exterior of the mill to facilitate the loading thereof. On the other hand, the slabs may pass into a hopper and be disposed of in any desired manner.

It is the intention of this invention that the saw 10 be operated automatically. Towards this end, there is provided a control shaft 124 which is disposed along the right side of the frame 16, as viewed in FIGURE 5, and exteriorly of the frame. The control shaft 124, as is best illustrated in FIGURE 8, is supported from the frame 16 by pillow blocks 126 which are secured to the uprights 28 and 30.

Mounted on the exterior of the frame 16 above the control shaft 124 is an electric motor 128. The electric motor 128 is connected to a reduction gear unit 130 by a drive belt 132 (FIG. 3). The reduction gear unit 130 has a drive sprocket 134 which is aligned with a driven sprocket 136 on the control shaft 124 and is connected thereto by a drive chain 138. In this manner the control shaft 124 is rotated at a relatively low speed.

Reference is again made to FIGURE 8 wherein it is shown that the control shaft 124 is provided with a plurality of cams. The cams include a cam 140 which is disposed adjacent the right hand pillow block 126. A pair of cams 142 and 144 are mounted on the control shaft 124 to the left of the left hand pillow block 126. A switch control cam 146 is mounted on the control shaft 124 to the right of the left pillow block 126. The cam 140 controls the swinging of the saw unit which includes the various components for supporting the shaft 104 and the individual saw blades 110 carried thereby. The cam 142 controls the swinging of the loading door 58, and the cam 144 controls the swinging of the bottom member 44.

Referring now to FIGURE 7 in particular, it will be seen that a mounting block 148 is secured to the frame member 18 on the upper side thereof and adjacent one end thereof. The mounting block 148 carries a shaft 150 which extends beyond the end of the frame 16 and which has pivotally mounted thereon the lower ends of a pair of levers 152 and 154. The lever 154, as is best illustrated in FIGURE 3, is provided with an intermediate portion 156 which is offset and which carries a follower 158 disposed in engagement with the cam 144. An elongated link 160 extends between the upper end of the lever 154 and the lever 91. The tendency of the bottom member 44 to swing downwardly continuously urges the follower 158 into engagement with the cam 144.

The lever 152 is identical with the lever 154 and includes a follower 162 which is engaged with the cam 142. The upper end of the lever 152 has connected thereto a link 164 whose opposite end is connected to the lever 76. The tendency of the loading door 58 to swing to a closed position holds the follower 162 in engagement with the cam 142.

Referring now to FIGURE 5 in particular, it will be seen that the frame 16 supports a shaft 166 in the central part thereof and down in the lower right hand corner, as viewed in FIGURE 5. The shaft 166 in turn pivotally supports a lever 168 which is identical with the levers 152 and 154. The lever 168 carries a follower 170 which is engaged with the cam 140. A link 172 extends from the upper end of the lever 168 to an attaching ear 174 secured to the intermediate upright member 106.

The details of the cam 146 are best illustrated in FIG-

URE 10. The cam 146 is designed to operate a switch 176 which has a control plunger 178. The cam 146 is oriented so as to stop the operation of the saw 10 in the desired position, which position has the saw blade 110 retracted, the bottom member 44 in a hopper forming position and the loading door 58 open. The switch 176 is mounted in parallel with a manually operated switch 180. The two switches 176 and 180 control the operation of the electric motor 128.

When the hopper 42 has been filled with the desired number of slabs, the operation of the saw 10 is initiated by closing the switch 180 manually. The switch 180 is held closed momentarily until the electric motor 128 rotates the control shaft 124 sufficient to close the switch 176. After this has been accomplished, the switch 176 will remain closed until the control shaft 124 makes one complete revolution, at which time it will open and a complete sawing cycle has been completed.

In a sawing cycle, which starts with the components in the positions illustrated in FIGURES 5 and 9 (upper left), the hopper 42 is first loaded by pushing slabs from the loading table 56 down into the hopper. When the sawing cycle is initiated, the loading door 58 is first moved to its closed position illustrated in FIGURE 3 with the cams in the positions shown in FIGURE 9 (upper right). Then the saw unit is pivoted to swing the saw blades 110 through the hopper 42 to saw the slabs therein into a plurality of short lengths with the cams in the positions shown in FIGURE 9 (lower left). At this time it is pointed out that the interior surfaces of the hopper 42, particularly the interior surfaces of the bottom member 44, may be provided with suitable cleats or other slab holding means to prevent their movement away from the swinging saw blades 110. After the saw blades 110 have made a complete cut, that is passed to the position illustrated in FIGURE 4, they are swung back to their initial starting position of FIGURE 5 by the cams in positions shown in FIGURE 9 (lower right). At this time the bottom member 44 is swung downwardly to its dotted line position of FIGURE 3 to discharge the cut slabs therein. The cut slabs fall down through the open frame 16, through the open support 14 and onto the conveyor 122. The bottom member 44 is then returned to its hopper forming position and the loading door 58 is opened to complete the cycle of operation.

As is best illustrated in FIGURE 5, the loading table 56 extends beyond the frame 16 in overlying relation to the control mechanism. A vertical shield 182 is disposed along the right side of the frame 16. A second vertical shield 184 is spaced from the vertical shield 182 to complete the closure for the control mechanism.

From the foregoing, it will be readily apparent that there has been provided a highly desirable power saw for cutting up slabs and other lengths of wood into short lengths. The lengths of the individual pieces of cut wood will vary depending upon the spacing of the saw blade 110 which may be that desired for the particular sawing operation. Since a plurality of slabs may be sawed in a single operation and since the sawing operation is automatic once it has been initiated, it will be readily apparent that one man can operate the saw 10 and cut large quantities of slabs therewith.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An automatic saw comprising, frame means, table means mounted on top of the frame means, hopper means fixedly mounted in the frame means below the table means, hopper closure means movably mounted by the frame means for opening movement above the table means, hopper unloading means movably mounted below the table means, rotating saw blade means movably mounted in the frame means below the table means for movement into and out of the hopper means, and single cycle initiated drive means operatively connected to the hopper closure means, hopper unloading means and saw blade means for sequentially closing the hopper means, moving the saw blade means into and out of the hopper means, unloading the hopper means and opening the hopper means.

2. The combination of claim 1, wherein said hopper means includes a pivotally mounted bottom member operative under control of the drive means to unload the hopper means by pivotal movement thereof.

3. The combination of claim 2, wherein said drive means includes cam means operatively connected to the hopper closure means, hopper unloading means and saw blade means for sequential operation thereof in response to rotation of the cam means and drive control means operatively connected to the cam means for continuous rotation thereof through one cycle of sequential operations.

4. The combination of claim 3, wherein said drive control means includes power means drivingly connected to the cam means, starting switch means connected to the power means for energization thereof and cycling switch means connected in parallel to the starting switch means for maintaining the power means continuously energized for one cycle of operation.

5. The combination of claim 1, wherein said drive means includes cam means operatively connected to the hopper closure means, hopper unloading means and saw blade means for sequential operation thereof in response to rotation of the cam means and drive control means operatively connected to the cam means for continuous rotation thereof through one cycle of sequential operations.

References Cited in the file of this patent
UNITED STATES PATENTS

| | | |
|---|---|---|
| 247,593 | Allen | Sept. 27, 1881 |
| 771,836 | Schantz | Oct. 11, 1904 |
| 1,309,017 | Chakrovarty et al. | July 8, 1919 |
| 1,411,045 | Leaver | Mar. 28, 1922 |
| 1,670,946 | Wolf | May 22, 1928 |
| 2,290,626 | Bosomworth | July 21, 1942 |
| 2,637,353 | Hyslop | May 5, 1953 |
| 2,663,330 | Hill | Dec. 22, 1953 |
| 2,686,350 | Payne | Aug. 17, 1954 |